Nov. 15, 1932.    O. SIMMEN    1,887,862
MOUNTING OF INTERNAL COMBUSTION POWER UNITS IN VEHICLES
Filed Sept. 23, 1931
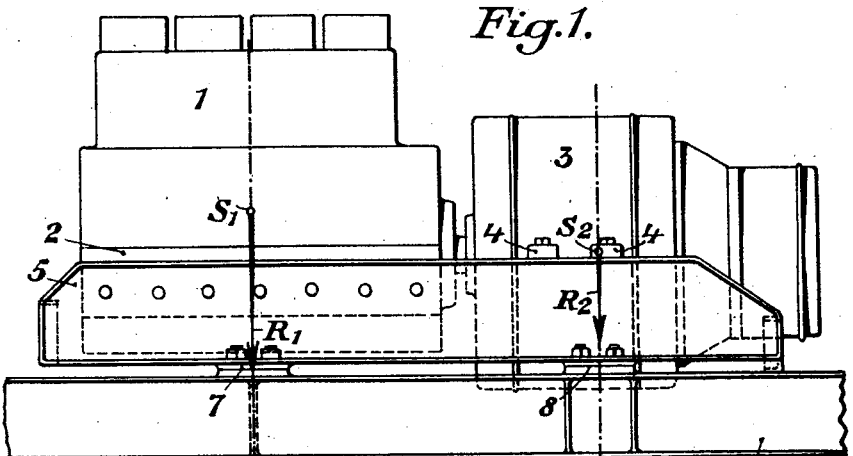
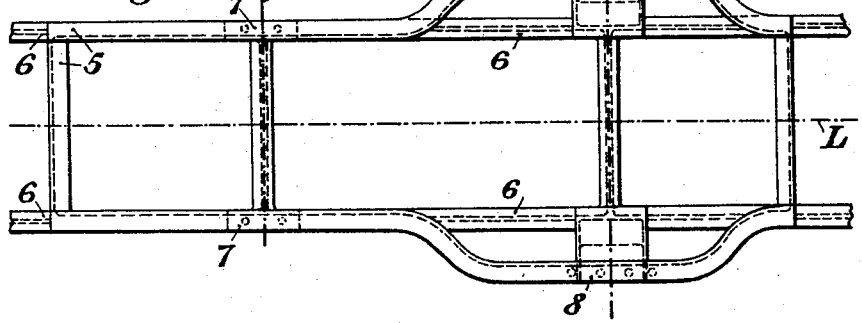
INVENTOR:
Oscar Simmen
BY
Pennie, Davis, Marvin + Edmonds
ATTORNEY.

Patented Nov. 15, 1932

1,887,862

UNITED STATES PATENT OFFICE

OSCAR SIMMEN, OF ERLACH, SWITZERLAND, ASSIGNOR TO THE FIRM OF SULZER FRERES SOCIETE ANONYME, OF WINTERTHUR, SWITZERLAND

MOUNTING OF INTERNAL COMBUSTION POWER UNITS IN VEHICLES

Application filed September 23, 1931, Serial No. 564,487, and in Switzerland October 15, 1930.

This invention relates to a vehicle, more particularly a railroad vehicle, driven by an internal combustion engine through gearing or other transmission mechanism, the engine and transmission mechanism being mounted in a sub-frame supported at bearing points by the vehicle frame.

In such arrangements trouble has been caused by flexing of the sub-frame due both to the transmission to it of the inevitable distortions in the vehicle main frame and to the unbalanced inertia forces set up when the engine is running. Such flexing causes relative movement between the engine and the transmission mechanism and either involves unduly high stresses in the shaft bearings or the provision of elastic couplings of an inconveniently bulky nature.

It has now been found that the unbalanced inertia forces referred to act at short distances only from the centre of gravity of the engine, and in most cases at points substantially coincident with that centre of gravity.

According to this invention the bearing points between the sub-frame and the vehicle frame are disposed so that they lie in substantially vertical planes disposed transversely with respect to the longitudinal axis of the engine and passing respectively through the centre of gravity of the engine and that of the transmission mechanism. Such planes are further preferably so disposed as to lie substantially at right angles to the longitudinal axis of the engine.

By disposing the sub-frame bearers in this manner pronounced flexing of the sub-frame is prevented and it is no longer necessary to provide complicated or bulky devices to minimize the effects of such flexing.

The following description and drawing have reference to one convenient example of the mounting of a sub-frame according to the invention. In the drawing:

Figure 1 is a side elevation of the power unit, sub-frame, and vehicle frame in assembled relation.

Figure 2 is a plan view of the sub-frame and vehicle frame.

The two longitudinal members of the sub-frame 5 carry the engine 1 and the transmission mechanism, which is shown for example as a current generator 3, through the intermediary of flanges 2 and lugs 4 respectively. According to the invention the points 7 and 8 at which the members 5 are supported by the vehicle frame 6 are so disposed that the points 7 lie in the plane $E_1$ which passes through the centre of gravity $S_1$ of the engine 1 and is disposed vertically at right angles to the longitudinal axis L thereof, while the points 8 lie in the plane $E_2$ which passes through the centre of gravity $S_2$ of the generator 3 and is also disposed vertically at right angles to the longitudinal axis L.

The resultant $R_1$ of the static pressures exerted by the flanges 2 on their supports 5, as well as that of the unbalanced inertia forces in the engine, in this arrangement passes approximately through the centre of the line joining the bearing points 7, and in the same way the resultant $R_2$ of the forces associated with the generator 3 passes approximately through the centre of the line joining the bearing points 8.

In this way it is possible to avoid the additional flexing stresses which would be exerted on the sub-frame with other arrangements of the bearing points 7 and 8, thereby providing a measure of protection to the shaft bearings. Another advantage of the arrangement is the elimination of external inertia forces due to rotation of the engine.

It will be appreciated that the construction above described may be modified in its details to suit special circumstances without exceeding the scope of the invention. Further, whilst the invention is particularly suitable for use on railroad vehicles, it may be applied to other types of power driven vehicle.

I claim:

In a vehicle, an internal combustion engine, a transmission mechanism, a frame for rigidly connecting these elements together to form a unit, said frame being located bodily above the vehicle main-frame and comprising two parallel members, each of said members having two bearing points on its lowest side, a bearing point being in transverse alignment with one on the other member, the transverse vertical plane passing through the center of gravity of the engine passing through the two transversely aligned bearing points, and the transverse vertical plane passing through the center of gravity of the transmission passing through the remaining two bearing points, whereby unbalanced forces due to vibration of the two movable members are directly and entirely absorbed by the upper frame so as to leave the casings and the connection between the movable members free from all vibration-strains.

In testimony whereof I have affixed my signature.

OSCAR SIMMEN.